T. R. Fancher,
Globe Valve,
№ 58,625. Patented Oct. 9, 1866.

Witnesses:
W<sup>m</sup> Vine
A. B. Woodward.

Inventor:
Theodore R. Fancher

UNITED STATES PATENT OFFICE.

THEODORE R. FANCHER, OF NORWALK, CONNECTICUT.

IMPROVEMENT IN STEAM-ENGINE GLOBE-VALVES.

Specification forming part of Letters Patent No. 58,625, dated October 9, 1866.

*To all whom it may concern:*

Be it known that I, THEODORE R. FANCHER, of the town of Norwalk, county of Fairfield, and State of Connecticut, have invented a new and useful Improvement in the Mode of Constructing Steam-Valves; and I do hereby declare that the following is a correct description thereof, reference being had to the accompanying drawings, and to the letters of reference marked thereon.

The nature of my invention consists in the arrangement of an adjustable annular ring to retain an elastic packing in its position, and prevent the same from spreading when pressed on the valve-seat.

To enable others skilled in the art to make and use my invention, I will proceed to describe the same.

Figure 1:
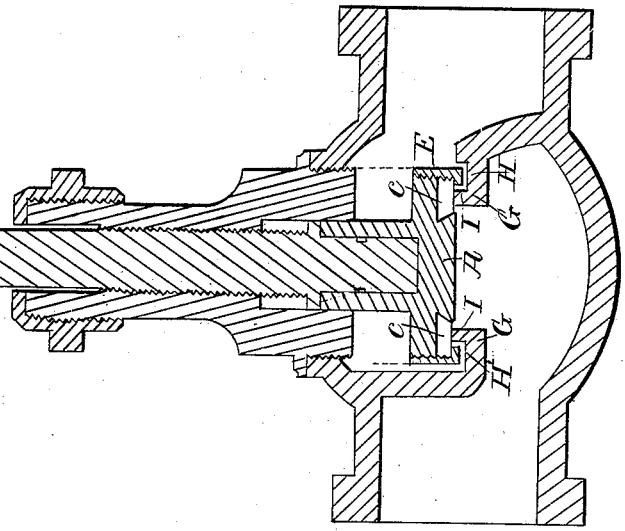
Figure 2:
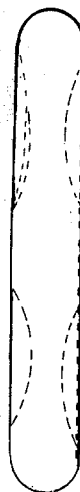
Figure 3:

In the drawings, Figure 1 is a longitudinal section of a globe-valve, illustrating the valve-seat and the position of my rubber packing and the adjusting annular ring; Fig. 2, the valve before being packed; Fig. 3, the annular ring.

A perfectly-tight joint to a steam-valve is a matter of great importance and a difficult thing to accomplish. I am aware of a metallic packing in device nearly similar to my elastic; but the meeting of two metals will not make so perfect and lasting a joint.

The periphery of the valve A is formed with a rabbeted recess, B, to receive a ring of india-rubber, C, or other suitable elastic substance, which is pressed on the rabbet B tightly, and will fill into the beveled part D of the rabbet B, and out fully to the outer edge, and nearly flush with the face of the valve.

I now construct the annular adjusting-ring E, having a projecting lip, F, with an internal fine screw-thread, and screw the same onto the valve A and over the rubber C, by which means the rubber will be firmly pressed into the rabbet B, both on the face and both edges, so that it will be impossible to come away from the face, and the edges cannot spread either inward or outward.

I now turn and form the valve-seat and opening G, as shown in the drawings, with a sunk recess, H, of a sufficient width and depth to recive the square lip or projection F of the annular ring E, and by this sinking, I form the vertical projection or fillet I, with a plain upper surface of about an eighth of an inch in width (more or less) for the valve-seat I, and which will be of a suitable size in diameter to press on the rubber C between the ring E and the periphery of the metallic face of the valve A.

By this means I get a perfectly-tight joint by the pressure of the rubber C on the plain face of the valve-seat I, caused by the screw action of the valve-rod, which operates in the usual manner. The pressure of the elastic rubber on the plain seat being square and direct, there will be no friction to wear the joint, and no grinding in of the valve required, so that the joint will remain perfect a long time; and the utility of it is the quick and easy way the same can be replaced or repaired.

I have fully proved my valve, and find it much better than the meeting of two metals.

What I claim as my invention, and desire to secure by Letters Patent, is—

The arrangement of the adjustable rubber ring C and screw-ring E, substantially as and for the purpose described.

T. R. FANCHER.

Witnesses:
WM. VINE,
ASA B. WOODWARD.